Jan. 4, 1927. 1,613,092
J. F. GALLUP
CULTIVATOR ATTACHMENT
Filed July 24, 1924
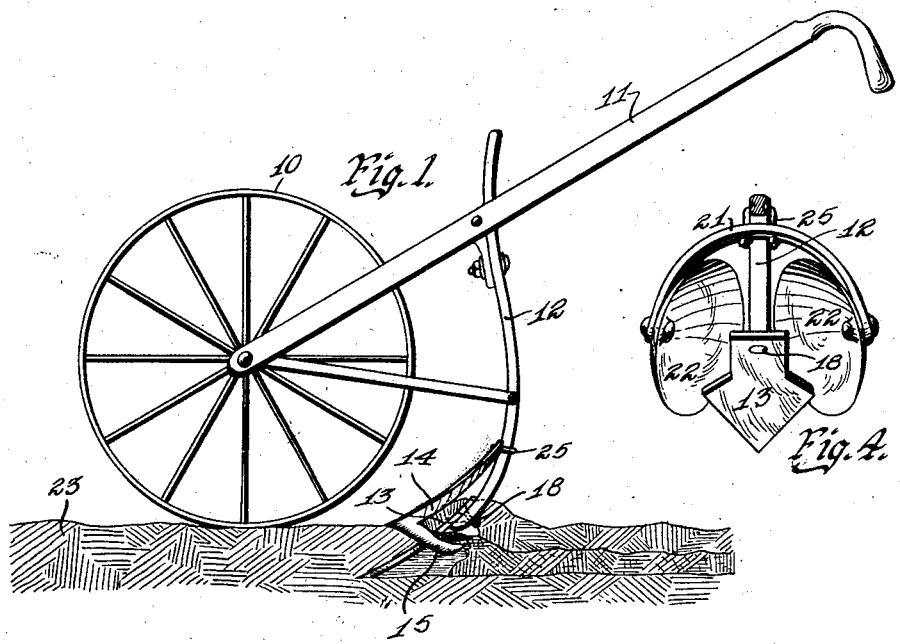
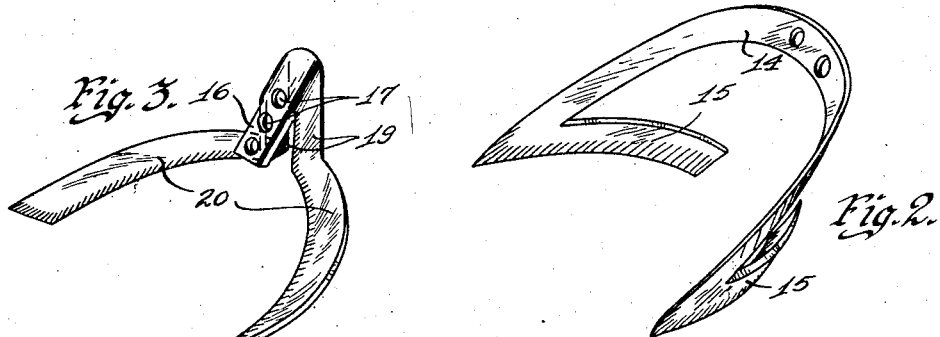
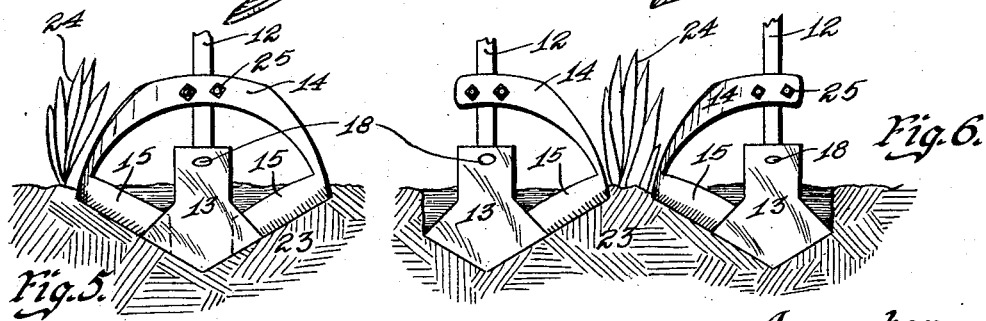
Witness
R. Rusher
Inventor
Josephus F. Gallup
by Bair & Freeman Attorneys Patented Jan. 4, 1927.

1,613,092

UNITED STATES PATENT OFFICE.

JOSEPHUS F. GALLUP, OF JEFFERSON, IOWA.

CULTIVATOR ATTACHMENT.

Application filed July 24, 1924. Serial No. 727,898.

The object of my invention is to provide a cultivator attachment of simple and inexpensive construction.

More particularly, it is my object to provide a cultivator attachment for shovel plows constructed and arranged to serve as a plant shield and to cut the weeds and move them from the plant row and to cut the shoulders left at the sides of the channel cut by the shovel, and to move the dirt thus cut into the channel formed by the shovel, so as to extend the width of cultivation for the full distance which the shovel would otherwise cut and cover.

Thus it is the object and nature of my invention to mount knives, wedges or disc-wheels in such position on a shovel plow as to serve as plant shields and to cut the relatively sharp shoulder from the trench or furrow made by the shovel and move the soil so cut behind the plow into the V-shaped portion of the trench or furrow below the upper shoulders thereof, thus cutting off such shoulders, moving the dirt toward the center of the trench, and permitting the dirt which rolls over, around and from the shovel plow to substantially fill the cut made by the attachment.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 shows a side elevation of a shovel plow equipped with an attachment embodying my invention.

Figure 2 shows a perspective view of a form in which my attachment may be embodied.

Figure 3 shows a similar view of a slightly different form of the attachment, in which the attachment is adapted to be mounted below the shovel.

Figure 4 is a front elevation of still another form of my attachment, assembled with relation to the shovel, illustrating the use of disc-wheels for cutting the shoulders of the ground.

Figure 5 is a front elevation of a shovel with my attachment thereon illustrating the operation of the attachment at one side of the plant row; and Figure 6 is a similar view illustrating the use of two shovels on opposite sides of the plant row and also showing and illustrating the operation of the attachment thereon.

It will be understood that my attachment may be used with various types of shovel plows.

For purposes of illustration, I have shown my attachment in connection with a hand-operated shovel plow having the wheel indicated by the reference character 10, the ordinary controlling handles 11, a plow or shovel beam 12 and a shovel 13.

My attachment may have the form illustrated for instance in Figure 2, comprising a bar 14 secured to the plow beam 12, above the shovel 13 in any suitable way as illustrated in Figure 1, and curved from its central portion outwardly, downwardly and forwardly, as shown in Figure 2.

Extending rearwardly from the lower forward arms or parts of the member 14 are the cutting knives or wedges 15, which are also in-curved toward each other, somewhat as shown in said figure, in order to reach from a point in front of the plow to a point behind the plow, as shown in Figure 1.

In Figure 3, I have shown another form of my attachment in which a short bar 16 is arranged to be secured to the back of the shovel. The bar 16 is provided with a plurality of spaced holes 17 to be selectively mounted on the bolt 18, whereby the shovel is mounted on the beam.

It will thus be seen that the bolt 18 can be inserted through either of the holes 17 for thus varying the height at which the attachment of the form shown in Figure 3 is mounted.

Extending downwardly from the upper end of the bar 16 are arms or the like 19, which are intended to extend substantially to the bottom of the furrow cut by the shovel.

The knives or wedges 20 extend from the lower ends of the arms 19 outwardly, forwardly and upwardly, so that at their forward ends they will stand substantially flush with the surface of the ground being cultivated.

In Figure 4, I have shown a bar 21 secured to the beam 12 above the shovel 13 and curved downwardly and outwardly as illustrated.

On the outer ends of the bar 21 are mounted disc-wheels 22, which are intended to cut off the shoulders of the trench formed by the shovel 13 and to carry the dirt back of the plow.

I will describe the operation of my attachment in connection with the operation of the plow, referring first to the form of my attachment shown in Figure 2.

As the plow with my attachment thereon is advanced through the ground 23, as shown for instance in Figures 1 and 5, the plow shovel 13 cuts a trench and when used alone, leaves a ridge of loose dirt at each side of the trench.

Where my attachment is used, however, the knives or wedges 15 cut off the rather sharp shoulder that is formed by the action of the shovel 13, as shown clearly in Figure 5, and move the dirt inwardly behind the shovel.

It will also be noted from the showing in Figure 5, that the knives or wedges 15 serve as a shield for the row of plants 24.

In Figure 6, I have illustrated two shovels arranged to operate on opposite sides of the row of plants 24, each being equipped with my attachment.

In this connection, it will be noted that the operation of the form of my invention shown in Figure 3 is the same as the operation of that form illustrated in Figure 2.

The knives or wedges 15 serve as shields for the plants 24 and also cut off the sharp shoulders of the trench formed by the shovel 13, move the dirt thus cut off inwardly, rearwardly and behind the plow. The loose dirt wedged or rolled over from the plow then drops in the void left by the knives cutting and carrying behind the plow.

Thus instead of leaving a narrow furrow or trench with ridges of dirt on each side thereof, as would be done by the use of the shovel plow alone, it will be seen that where my attachment is employed, a wider trench is cut with the loose dirt left more nearly level in the trench behind the plow.

I thus protect the plants and cultivate the whole width which would otherwise be cut and covered by the shovel plow alone and leave the loose dirt more nearly level and in a better arrangement than would be the case with the shovel plow alone.

The use of the discs mounted in the manner shown in Figure 4 affords another form of structure for accomplishing the same desirable results.

It will therefore be noted that I have provided an attachment for shovel plows, which can be made at a very small expense.

The attachment can be quickly and easily assembled on the plow and can be readily and easily adjusted.

In the form of the device shown in Figures 2 and 4, the bars 14 or 21, as the case may be, may be mounted on the beam by means of U-bolts or other fastening means 25, which will permit ready adjustment of the attachment up or down on the plow beam.

It will be obvious from the foregoing that changes may be made in the details of the structure and arrangement of the parts of my improved attachment without departing from the real spirit and purpose of my invention, and it is my intention to cover by my patent any modified forms of structure or use of mechanical equivalents, which may be reasonably included within the scope of my claims.

I claim as my invention:

1. In a structure of the class described, the combination of a shovel plow with an attachment therefore, comprising cutting elements supported at the side of the plow and having cutting edges extending rearwardly, downwardly and inwardly and arranged to slope the shoulder of the trench formed by the plow and to move the dirt thus cut behind the plow.

2. In a structure of the class described, the combination of a beam and a shovel plow thereon with an attachment comprising a cutting element, means for adjustably mounting said cutting element on said beam for supporting it at different heights, said cutting element being supported at the side of the plow to incline from a point in front of the plow rearwardly, downwardly and inwardly for sloping the shoulder of the trench formed by the plow and throwing dirt into the furrow made by the plow.

Des Moines, Iowa, May 21, 1924.

JOSEPHUS F. GALLUP.